April 5, 1927.
E. BEDNARZ
SIGNAL FOR VEHICLES
Filed Oct. 6, 1924
1,623,903
2 Sheets-Sheet 1
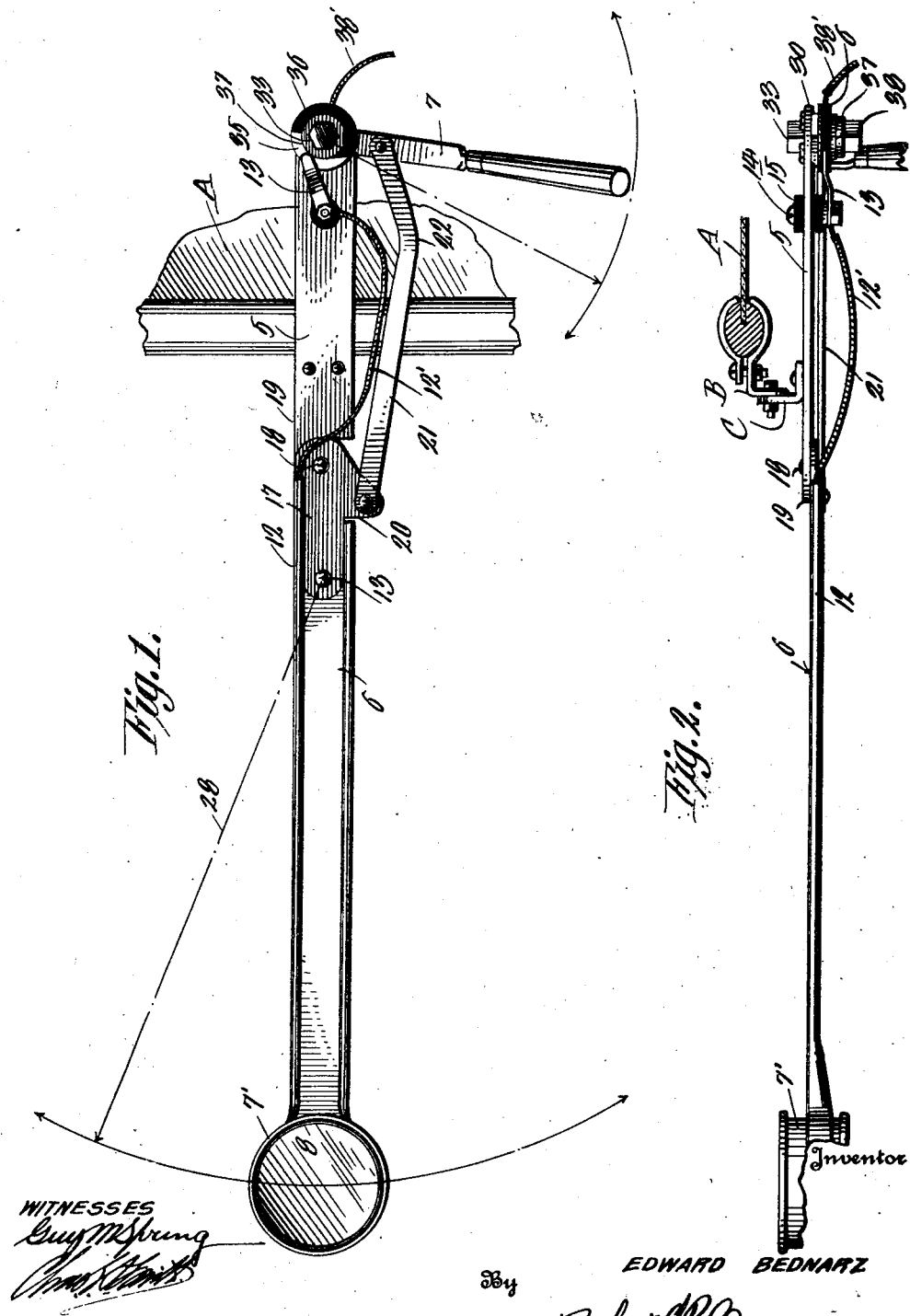
Inventor
EDWARD BEDNARZ April 5, 1927.
E. BEDNARZ
1,623,903
SIGNAL FOR VEHICLES
Filed Oct. 6, 1924
2 Sheets-Sheet 2
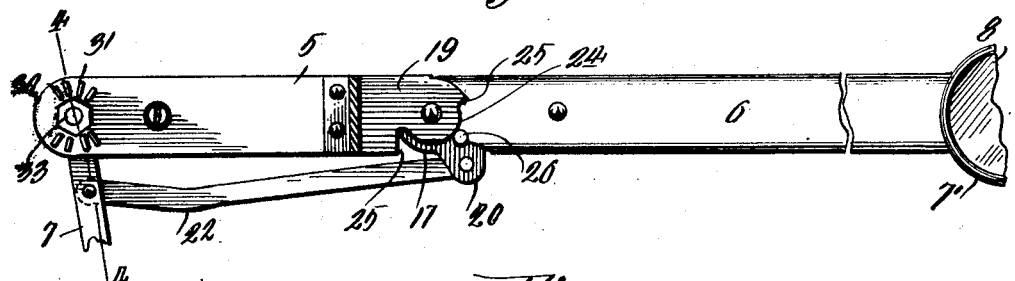
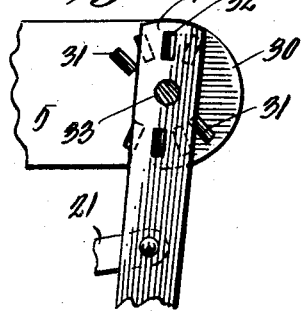 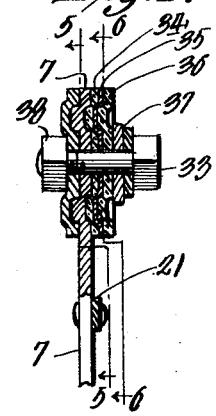 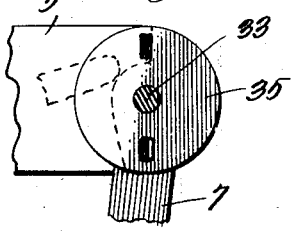
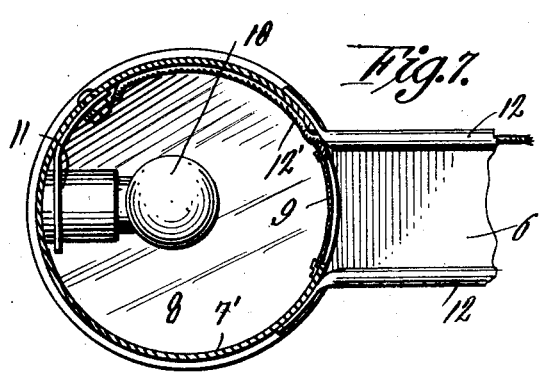
WITNESSES
Inventor
EDWARD BEDNARZ
By Richard B. Owen, Attorney Patented Apr. 5, 1927.

1,623,903

UNITED STATES PATENT OFFICE.

EDWARD BEDNARZ, OF EVERETT, WASHINGTON.

SIGNAL FOR VEHICLES.

Application filed October 6, 1924. Serial No. 742,051.

The present invention relates to an improved signal for vehicles having for its prime object to provide a device of this nature which may be easily and conveniently operated by the driver of an automobile for signaling other drivers and pedestrians as to his intention in turning or stopping.

Another important object of the invention is to provide a novel construction of a signal of this nature which will be cheaply manufactured and will be durable and effective under all conditions, and which is not liable to readily get out of order.

With the foregoing and other objects in view as will appear as the description proceeds, the invention resides in the combination and arrangement of parts and in the details of construction hereinafter described and claimed, it being understood that changes in the precise embodiment herein disclosed can be made within the scope of what is claimed, without departing from the spirit of the invention.

In the drawing:

Figure 1 is an elevation of the signal showing the same mounted on a wind shield, Figure 2 is a top view thereof, Figure 3 is an elevation of the device opposite from that shown in Figure 1, Figure 4 is a section taken substantially on the line 4—4 of Figure 3, Figures 5 and 6 are detail sections taken substantially on the lines 5—5 and 6—6 respectively of Figure 4, and Figure 7 is a section through the end of the semaphore arm.

Referring to the drawing in detail it will be seen that the wind shield is designated by the letter A and a suitable clamp B mounted thereon for holding a bracket C which acts as a support for the signal. The signal includes a stationary bar or plate 5 having a semaphore arm 6 at one end and a crank or lever 7 at its other end. The semaphore arm 6 possesses an elongated formation and has mounted on its outer end a casing indicated at 7'. This casing 7' is in the form of a drum having two oppositely disposed transparent panels 8 and a third transparent panel 9 throwing a beam of light toward the semaphore arm. A suitable source of light 10 is disposed in this casing being preferably in the form of an incandescent electric bulb the socket 11 of which is connected to the lead 12'. The side edges of the semaphore arm 6 are rolled to provide beads 12 through which the wire 12' passes the end of which is connected to a spring contact 13 supported on the stationary arm 5 by means of a bolt 14 and insulated therefrom as at 15.

A plate 17 is disposed at the pivoted end of the semaphore arm 6 being held between the beads 12 thereof and by means of a rivet or other fastening element 13. This plate is pivoted by means of a pin 18 to the end 19 of plate 5. A projection 20 is formed on the plate and a link bar 21 is pivoted thereto. This link bar 21 is also pivoted to an intermediate portion of the operating lever 7. The link bar is curved intermediate its end as at 22. The end 19 of the plate 5 is rounded as at 24 being provided with stops 25 against which will abut a pin or lug 26 on the projection 20 of plate 17 thereby limiting the swinging movement of the semaphore arm 6 allowing it to swing a little above the horizontal position down through to a vertical position. The position above the horizontal position is indicated by the line 28 would indicate a right hand turn while the horizontal position would indicate a left hand turn.

The lever 7 is pivoted on the end 30 of plate 5. This end 30 has an annular series of depressions 31 formed therein while the pivoted end of the lever 7 is provided with projections 32 located to engage in the depressions 31 and hold the lever in different positions. The lever is pivoted on a bolt 33 passing through the end 30 of the plate 5 and through a plurality of washers 34, 35 and 36 and also washers 37. A nut 38 is disposed on the end of the bolt. The washers 34, 35 and 36 are formed with thrust out portions that fit in the recesses formed by the projection 32 being pressed out of the lever 7 and therefor turn when this lever is swung. The washers 34 and 36 are formed of insulating material while the washer 35 is formed of a conducting material. The washer 36 is partially cut away and the finger of spring contact 13 is adapted to bear on either the exposed portions of washer 35 or the portion of washer 36 which is shown in Figure 1. A lead 38 is connected to the washer 35.

Considering the device as illustrated in Figure 1 it will be seen that if the lever 7 is swung in a counter clockwise direction that it will pull upon the link rod 21 to swing the semaphore arm 6 into a vertical position and when so disposed the contact 13 will be engaged with the insulating washer 36 causing the breaking of a circuit including the source of illumination and leads 18 and 38. By swinging this lever 7 back in a clockwise direction the semaphore arm may be moved to the horizontal position shown in Figure 1 or to a more raised position as indicated by the line 28. The projections 32 and depressions 31 will hold the lever in different desired positions and of course hold the semaphore arm in different desired positions through the intermediacy of link rod 21.

It will now be apparent that I have devised a novel and useful construction of a signal particularly useful on automobiles and like vehicles, which embodies the features of advantages enumerated as desirable in the statement of the invention in the above description, and while I have in the present instance shown and described a preferred embodiment of it which will give in practice satisfactory and reliable results, it is to be understood that the same is susceptible of modification in various particulars without departing from the spirit or scope of the invention as hereinafter claimed or sacrificing any of its advantages.

Having thus described my invention, what I claim as new is:

1. A signaling device of the class described including in combination a plate having one end provided with an annular series of depressions and the other end provided with a rounded edge having spaced projections, a lever pivoted on the first mentioned end of the supporting plate and provided with projections cooperating with the depressions to hold the lever in different positions, the other end of the supporting plate having an opening, a pin extended through the opening, a semaphore, a plate fixed to the semaphore and pivoted on the pin, a projection extending from the plate adapted to move along the rounded edge of the second mentioned end of the supporting plate and to abut the projections thereon, an extension formed on the plate, a link rod pivoted to the extension at one end and at its other end to the lever all in the manner and for the purpose specified.

2. A signaling device comprising, in combination an elongated plate adapted to be mounted transversally on a vehicle, a lever pivoted on the inner end of the said plate, a semaphore, a connecting plate secured to the semaphore having an offset projection, the inner end of said plate being pivotally connected with the support plate, and a link pivotally connected with the projection on the semaphore plate and with the intermediate portion of the lever whereby swinging movement of the lever will swing the semaphore.

3. A signaling device, comprising, in combination, an elongated plate arranged in transverse position on a vehicle, the inner end of the plate provided with an annular series of depressions and the opposite end of the said plate being rounded and formed with spaced projections, a lever pivoted on the inner end of the supporting plate provided with an annular series of projections co-operating with the depressions to maintain the lever in different positions, a semaphore pivotally connected with the outer end of the supporting plate, a connecting plate secured to the inner end of the semaphore having an offset projection, and a link rod pivotally connected to the said connecting plate projections and lever.

In testimony whereof I affix my signature.

EDWARD BEDNARZ.